Figure 1:
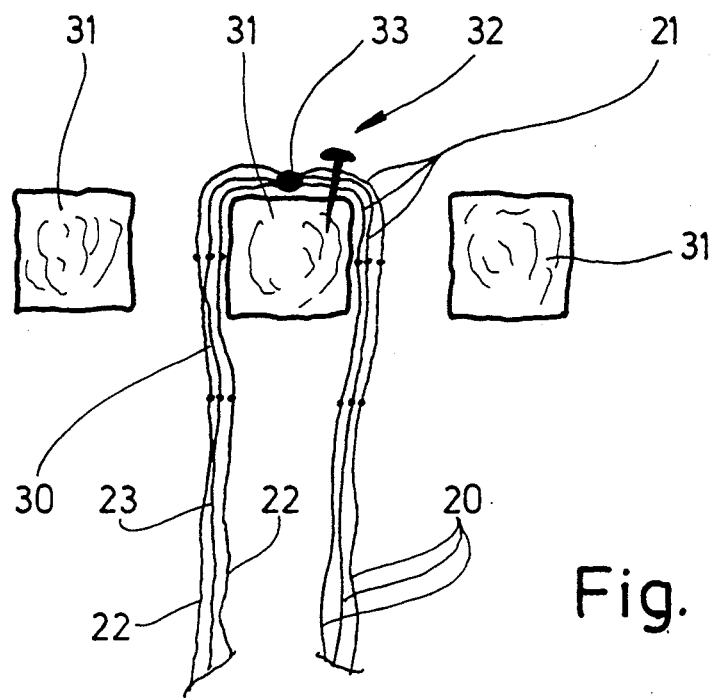

United States Patent [19]

Basse et al.

[11] Patent Number: 5,104,716
[45] Date of Patent: Apr. 14, 1992

[54] CONTACT MATERIAL

[75] Inventors: Hartwig Basse; Jürgen Wittek, both of Nordenham, Fed. Rep. of Germany

[73] Assignee: Norddeutsche Seekabelwerke, Fed. Rep. of Germany

[21] Appl. No.: 318,653

[22] Filed: Mar. 3, 1989

[30] Foreign Application Priority Data

Mar. 9, 1988 [DE] Fed. Rep. of Germany ....... 3807695

[51] Int. Cl.$^5$ .............................................. B32B 3/10
[52] U.S. Cl. ..................... 428/137; 210/150; 210/505; 428/131; 428/192; 428/284; 428/286; 428/294; 428/297; 428/298
[58] Field of Search ............... 428/294, 297, 232, 229, 428/230, 231, 370, 192, 284, 131, 137, 286, 298; 210/150, 505

[56] References Cited

U.S. PATENT DOCUMENTS 2,749,965  6/1956  Manning ............................ 428/232
4,756,942  7/1988  Aichele ............................. 428/114

FOREIGN PATENT DOCUMENTS

43414/85  12/1985  Australia .
1504212   9/1969   Fed. Rep. of Germany .
1759102   5/1971   Fed. Rep. of Germany .
3345595   6/1985   Fed. Rep. of Germany .

Primary Examiner—James J. Bell
Attorney, Agent, or Firm—Cook, Egan, McFarron & Manzo, Ltd.

[57] ABSTRACT

A plastic contact material is disclosed for the treatment of a liquid, comprising a plurality of strips made of a plastic material and wherein each of the strips has at least one tension element. A process is also disclosed for manufacturing a biological water treatment contact material made of a plurality of strips of a plastics material, which process comprises providing at least one strand at an elevated temperature, and applying the strand to a strip of plastic material while the strand is still at said elevated temperature.

10 Claims, 6 Drawing Sheets

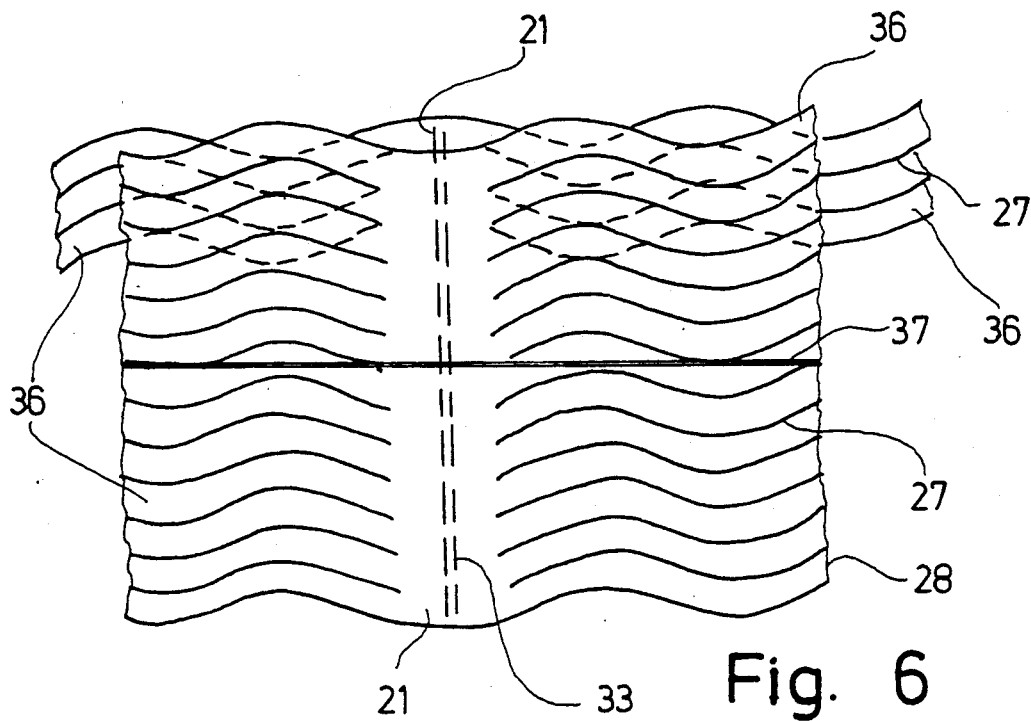
Fig. 6
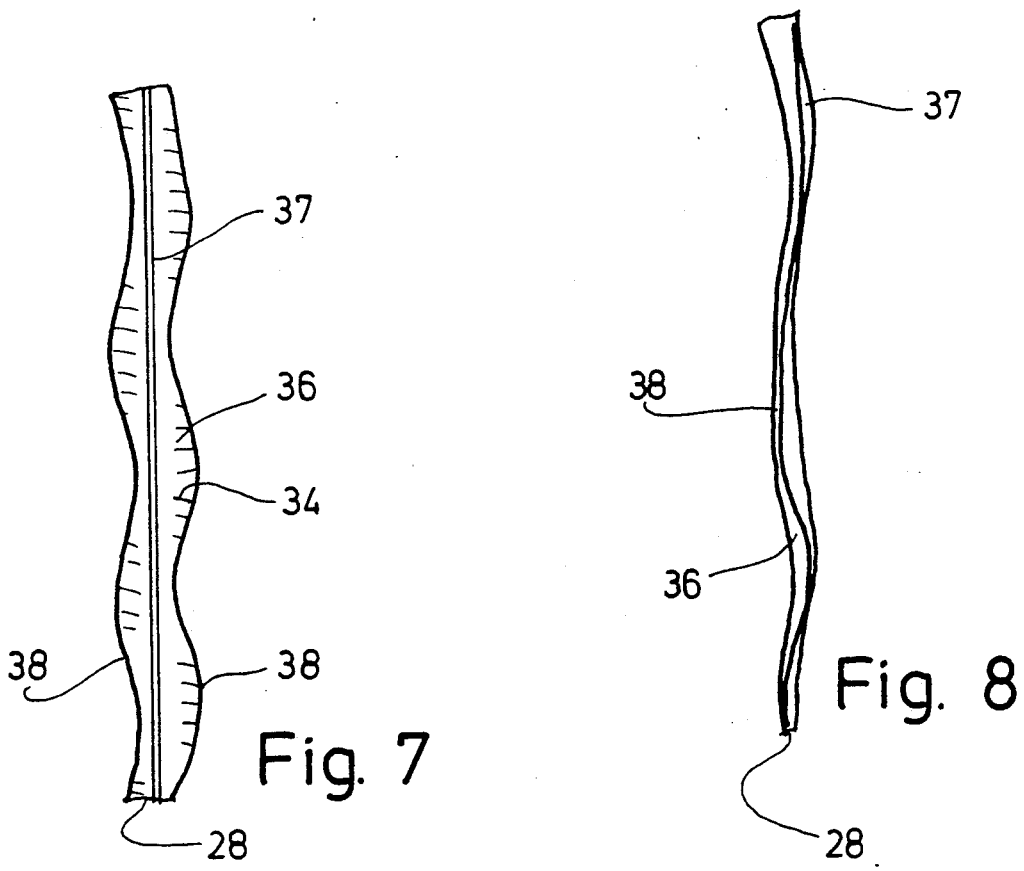
Fig. 7
Fig. 8

CONTACT MATERIAL

The present invention relates to a plastics contact material for treating liquids and, in particular, to such plastics contact material comprising a plurality of strips of plastics material which may be used, for example, in biological water treatment. The present invention further relates to a process for manufacturing contact material for biological water treatment.

The contact material in question here is utilized in particular for biological treatment in the water industry. In this use, the contact material serves as a support material for the bacteria required for the biological treatment, i.e., as a support material for a so-called biological lawn. The utility of a water treatment plant equipped with such a contact material depends on several factors. On the one hand, the contact material should provide a very large specific growth area, while on the other hand good adhesion of the bacteria to the contact material is very important. Finally, the biological lawn on the contact material should be easily permeable or wettable by the liquid to be treated.

The known contact material of the type referred to above, i.e., a contact material made of a plurality of plastics strips, has the disadvantage that the smooth strips tend to stick to one another, as a result of which the liquid to be treated is no longer able to flow through between the biological lawn of adjacent strips, appreciably reducing the effectiveness of a water treatment plant equipped therewith. As a remedy it has been tried to use strips having an irregular, predominantly crimped surface. However, it was found that, as a consequence of the weight on the strips due to the biological lawn growing thereon, even previously crimped strips become smooth in time with the consequence that even they gradually become stuck together.

In addition, it proved expensive to form the known striplike contact material into trickling filters, since it is very difficult to suspend the strips from an appropriate carrying means in the uniform distribution over the entire trickling filter required for optimum performance.

Against this background, the present invention has for its object to provide an effective and easily mountable striplike contact material and a process for a simple manufacture thereof.

According to the present invention, this object is achieved with the contact material comprising a plurality of strips made of a plastics material, wherein the strips have at least one tension element. The effect obtained by arranging at least one tension element on every one of the strips is that the weight of the biological lawn growing on the strips does not extend and consequently smooth the strips with the result that adjacent strips become easily stuck together. On the contrary, it has been found, surprisingly, that the strips provided with at least on tension element undergo twisting under the action of a load. A sticking together of adjacent strips is then virtually no longer possible.

Advantageously, the tension element is constructed as a tension-absorbing (round) strand extending in the longitudinal direction of the strip. This strand is easy to manufacture and has virtually no impairing effect on the growth of the strips.

It is proved particularly advantageous to assign to each strip a single (central) strand. The strips thus reinforced curl under a load around the strand which thus forms, as it were, a longitudinal central axis of a spiral.

According to a further essential proposal of the invention, the strands have each been bonded to the associated strips in such a way that when the strands are stretched or straightened out the strips bonded thereto have a crimped or wavy shape at least in the areas of their opposite edges. Effectively, the tension-absorbing strands ensure that even weighted strips retain their shape, since the strands prevent any extension and thus any smoothing out of the strips.

It is further proposed to join together a plurality of strips by one holding web at a time. Preferably, the strips are molded on the holding web, so that strips and holding web form a one-piece construction. This has the effect that the strips are permanently connected to one another with sufficient strength.

Advantageously, there are, on opposite sides of each holding web which is transverse to the longitudinal extension of the strips, groups of spaced-apart strips in a side by side arrangement. The strips thus extend "plait-like" in opposite directions from parallel edges of the holding webs.

In a refinement of the contact material it is proposed to provide the areas between adjacent strips that border on the holding web with clearances. These clearances can be brought about when the adjacent strips have a narrower width along the length of the clearances. The clearances have the function in the contact material, customarily laid with the holding web and downwardly extending strips across a support bar, to guide the dirty water, applied from above to the holding bar or web, toward all sides of the strips for uniform wetting thereof.

Finally, according to a further proposal of the invention, the contact material is refined to the extent that a plurality of holding webs with strips arranged thereon are gathered together on top of one another in such a way that the holding webs—and only the holding webs—are connected to one another. The strips of the individual superposed layers are thus not connected and thus can be wetted from all sides. In such a contact bed, a relatively large number of strips can be joined together to form a one-piece unit which can be suspended from a supporting frame as a whole. This makes it possible to obtain high assembly efficiency.

The process according to the invention has the features set forth in the appended claims. In this process, the threads serving to stabilize the strips are first manufactured separately and then bonded to the strips. The particularity of this process resides in the fact that the strands are still hot or warm when they are bonded to the (cold) strips. This has the effect, on the one hand, that the still warm or hot strands become bonded or welded to the strips without adhesive or other after-treatment measures. On the other hand, as the plastics strands cool down and consequently shrink at the same time, the cold, i.e., nonshrinkable, strips are crimped. This crimping, which serves to increase the specific growth area and thus is desirable, is thus obtained in the process according to the invention without special measures, as a by-product as it were.

It is further proposed according to the invention to seal a plurality of strands simultaneously onto a web serving to form a comparatively large number of side by side strips, and after the strands have cooled down, to divide the web by means of progressive separating cuts between two adjacent strands to form side by side strips. This process permits a high fabrication capacity since a plurality of side by side strips can be manufactured at the same time.

It is further proposed to form the holding web serving to join together side by side strips by suspending the separating cuts to form side by side strips from the web at regular intervals. The holding strips are thus formed very simply by leaving the web used for forming the strips unchanged iin the areas of the holding strips. This is thus an essential simplification of the manufacture of the contact material according to the invention.

Finally, it is also proposed for the process that to create a larger handling unit comprising a relatively large number of independent strips a plurality of webs are gathered together. To this end, a plurality of webs are brought together and, after the individual strips have been cut, are bonded together at their holding strips, preferably by welding. In this way it is possible to gather together an appreciable number of strips and to mount them as a whole on a supporting frame or the like of the trickling filter.

Figure 2:
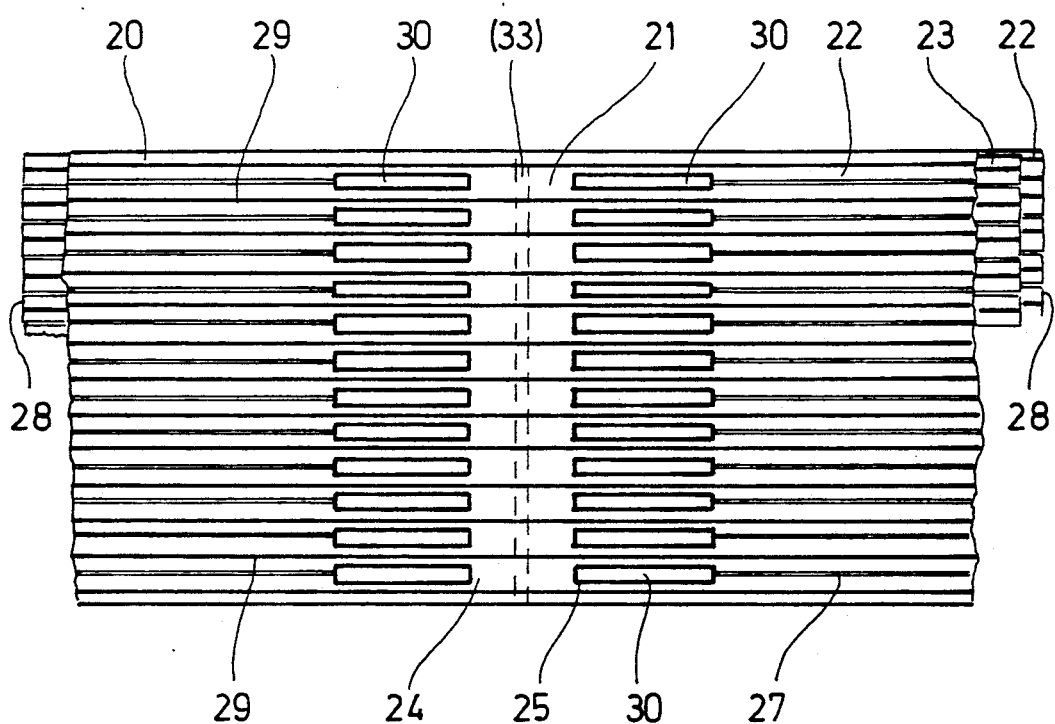
Figure 4:
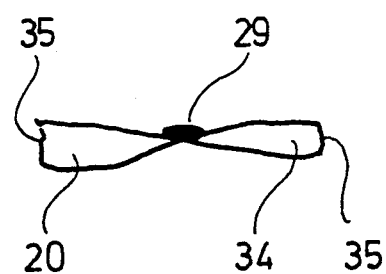
Figure 3:
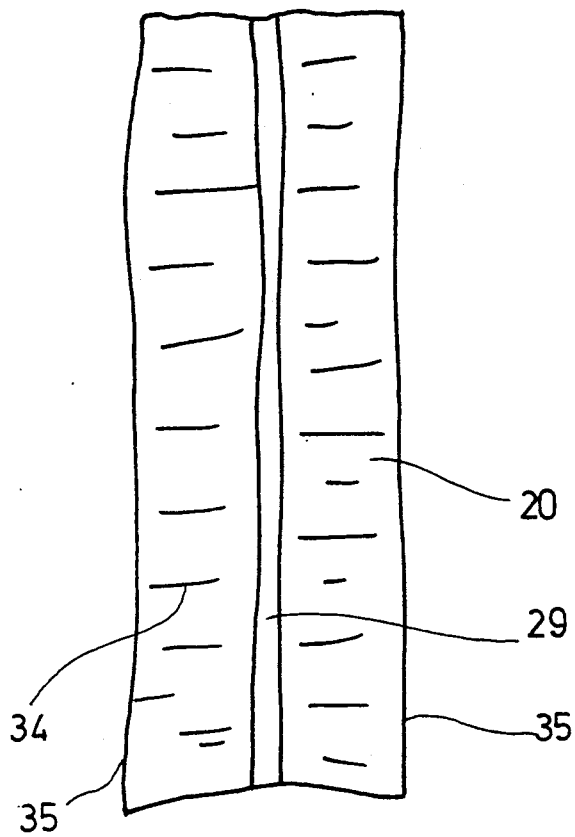
Figure 5:
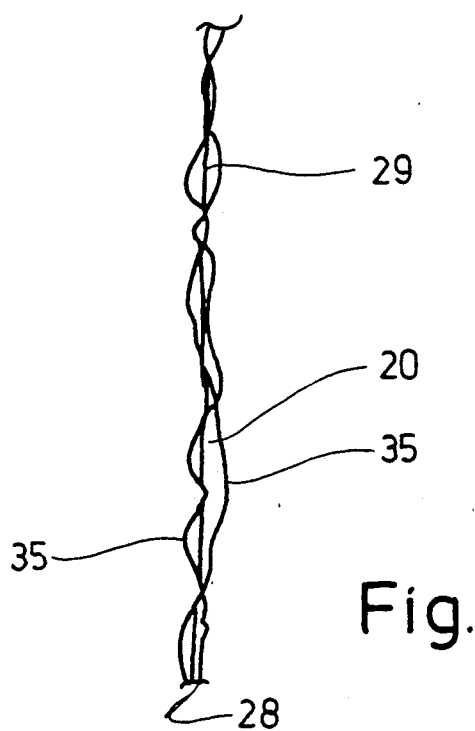
Figure 9:
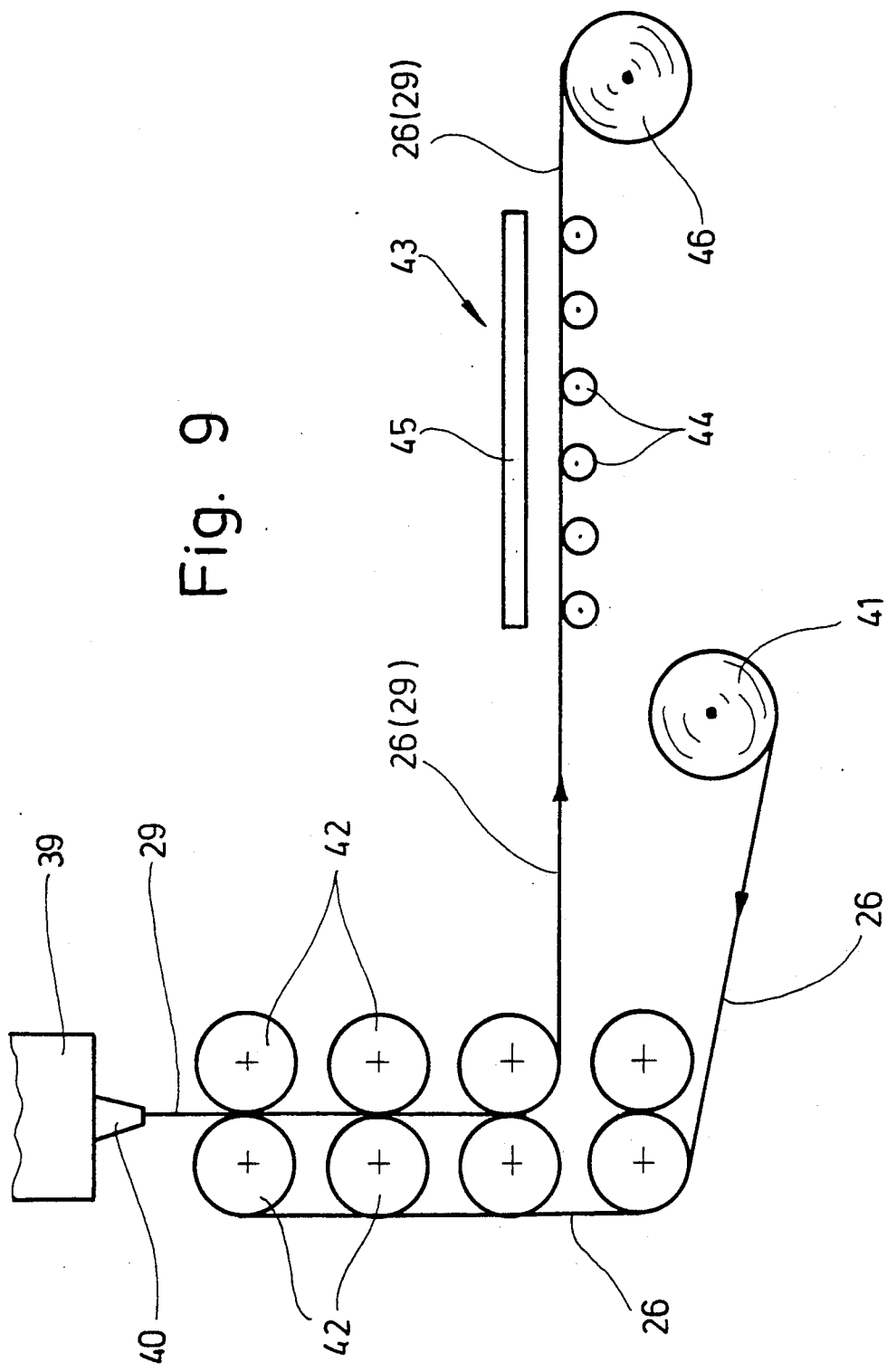
Figure 10:
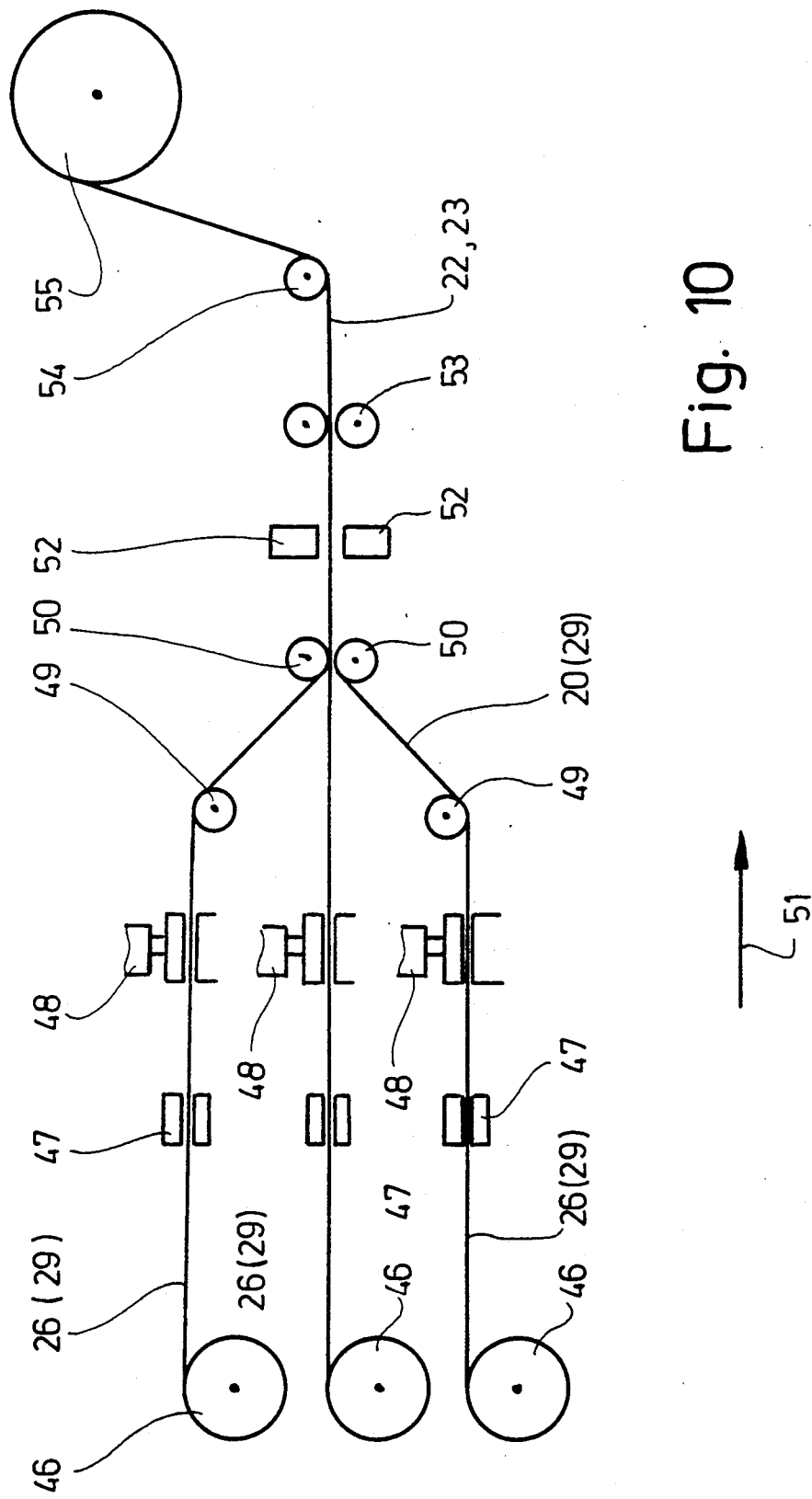
Figure 11:
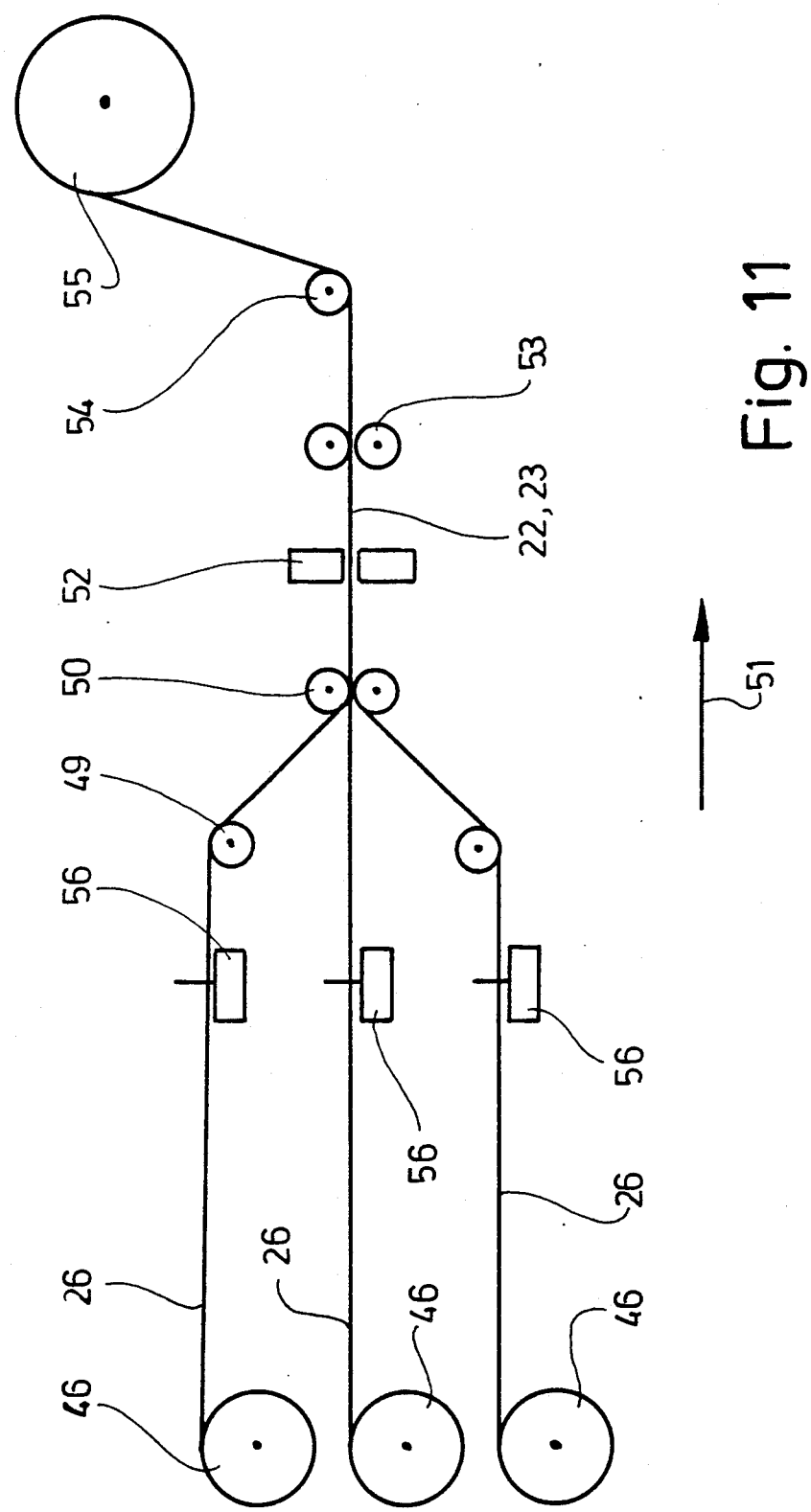

Illustrative embodiments of contact material according to the invention and apparatus for manufacturing the same are illustrated hereinafter by reference to the drawing, where FIG. 1 shows a detail of a trickling filter comprising a contact material hung over a supporting frame, FIG. 2 shows a plan view of the contact material according to FIG. 1, FIG. 3 shows a magnified two-dimensional view of a section of a single strip of contact material, FIG. 4 shows a cross-section through the strip according to FIG. 3, FIG. 5 shows a side view of the strip according to FIG. 3, FIG. 6 shows a plan view of a further illustrative embodiment of the contact material, FIG. 7 shows a magnified two-dimensional view of a section of a strip of the contact material of FIG. 6, FIG. 8 shows a side view of the strip according to FIG. 7, FIG. 9 shows an apparatus for applying strands to a web of material serving to form a plurality of strips, FIG. 10 shows an apparatus for cutting the strips out of the web of material and for bringing together a plurality of superposed webs, and FIG. 11 shows an alternative illustrative embodiment of the apparatus according to FIG. 10 for manufacturing strips according to the illustrative embodiment of FIGS. 6 to 8.

The contact material shown in the illustrative embodiments serves as a trickling filter for biological water treatment.

FIGS. 1 to 8 show embodiments of contact material where a plurality of side by side, elongated strips 20 are connected to one another by a central, transversely extending holding web 21. Individual strips 20 of the contact material here are arranged in three superposed layers 22 and 23. As FIG. 2 shows, the two outer layers 22 have the same number of strips 20. Similarly, the arrangement of the strips present in the outer layers 22 is approximately the same. By contrast, the central layer 23 has one strip 20 fewer. As a result, the strips 20 of the central layer 23 can be arranged offset relative to those of the two outer layers 22 in such a way that the strips of the central layer 23 come to lie centrally between two strips 20 of the outer layers 22, i.e., opposite a gap. The length of the strips 20 is approximately the same in every layer 22 or 23.

As can be seen from FIG. 2, the strips 20 situated at opposite end areas 24 and 25 of the holding web are integrally connected to the holding web. To this end, the holding web 21 and the strips 20 associated therewith are made of a common web of material 26 which, in the areas bordering the holding web 21, is provided with continuous incisions 27 to form the strips 20. Accordingly, the side by side strips 20 are separated from each other in each case by an incision 27 which extends continuously from the free ends 28 of the strips 20 to the respective end area 24 or 25 of the holding web 21.

In the present illustrative embodiment, as can be seen in FIGS. 1 to 5, each strip 20 has associated with it a tension element, namely a strand 29. As can be seen in particular in FIG. 2, in each case one straight strand extends from the free end 28 of a strip 20 situated on one side of the holding web 21 to the (opposite) free end 28 of a strip situated on the other side of the holding web 21. One strand 29 thus joins together two opposite strips 20 by extending uninterruptedly transversely across the holding web 21. The arrangement of the strands 29 is such that they are situated on one side in the middle of the strips. This can be seen clearly in FIG. 4. As can again be seen in FIG. 2, each of the layers 22 and 23 has as many parallel strands 29 as they have side by side strips 20.

As can further be seen from FIG. 2, but also from FIG. 1, (end) areas of the strips 20 that are oriented toward the holding web 21 have been provided with incisions 30, which are approximately rectangular and are each situated between two adjacent strips 20, as a result of which the strips 20 have a reduced width in the areas of the incisions 30, without, however, interrupting the strands 29. The purpose of the incisions 30 is to ensure that, when in the suspended state on a supporting bar 31 of a supporting frame 32, the liquid trickled downward onto the trickling filter can get to the strips 20 of the central layer 23 and to the outer layer 22 oriented toward the supporting bar 31, i.e., to ensure uniform wetting of the strips 20 of all the layers 22 and 23.

As can also be seen in FIG. 1, the different layers 22 and 23 are bonded to one another in the central area of their holding webs 21 by a weld seam 33 which extends in the longitudinal direction of the holding web 21 and transversely to the strips.

It is evident from FIGS. 3 to 5 that, in contradistinction from the strand 29, which extends in an approximately straight line, the strip 20 has been crimped, the type of crimp being such that it possesses folds 34 which extend transversely to the longitudinal direction. The parallel edges 35 of the strip 20 therefore show a degree of undulation, as can be seen particularly clearly in FIG. 5, which gradually decreases from the edges 35 to the (central) strand 29. By virtue of this configuration the strip 20 has conferred upon it a three-dimensional structure which is an optimal surface for the "biological lawn" to be grown thereon for biological water treatment.

In the illustrative embodiment shown, the strand 29 has an approximately circular cross-section whose diameter is appreciably greater than the thickness of the material of the strip. A suitable material for the strand 29 is a thermoplastic of low extendibility, for example polypropylene or polyethylene. As a result, and supported by the strand 29, the strip retains its length in the weighted state, i.e., when bearing the "biological lawn" growing on the surface of the strip 20, to a substantial extent and is prevented from becoming smooth, in particular at its wavy edges 35.

In contradistinction from the contact material described in FIGS. 1 to 5, the contact material shown in FIGS. 6 to 8 is made up of strips 36 which, seen in plan view, extend in snakelike fashion, namely sinusoidally. These strips 36, as shown in FIGS. 6 to 8, can also be provided on one side with a strand 37 which here extends in a straight line. To this end, the strip 36 in the present illustrative embodiment extends alternately to one side o to the other side of the (straight) line 37, ensuring constant contact of the strip 36 with the strand 37. Alternatively, it is also possible to have the strand follow the snakelike line of the strip, in which case the strand then also extends in snakelike fashion.

As can be seen in FIG. 8, the parallel snaky edges 38 of the strip 36 in the illustrative embodiment shown are crimped, so that they too have a wavy appearance. Such a strip 36 has a large spatial extension, providing particularly large growth areas for the "biological lawn." Alternatively, with the snakelike strips 36 shown here it is conceivable to dispense with the corresponding strands 37.

An apparatus for manufacturing the strands 29 and bonding the same to a web of material 26 for forming the strips 20 is shown in FIG. 9. In the apparatus shown, a plurality of spaced-apart side by side strands 29 are produced by an extruder 39. The strands 29 emerging from a mouthpiece 40 of the extruder 39 are still hot, i.e., at a point immediately downstream of the mouthpiece 40, when they are brought together with the cold web of material 26 and welded or sealed together therewith. To this end, the web of material 26 is taken off a stock reel 41 and guided between appropriate pairs of rolls, namely, three pairs of rolls 42 in the present illustrative embodiment, through which the still hot strands 29 emerging from the mouthpiece 40 of the extruder 39 also pass. In the course of the strands 29 and the web of material 26 being passed through the pairs of rolls 42 the strands 29 are welded to the web of material.

Downstream of the pairs of rolls 42, the web of material 26 provided with the strands 29 is guided through a cooling station 43. This cooling station 43 has a plurality of support rollers 44 bearing against the underside of the web of material 26 and a cooling means 45 coordinated with the opposite top side of the web of material 26 on which the strands 29 are situated. In the course of the cooling taking place in the cooling station 43, the strands 29 undergo shrinking and the cold, i.e., nonshrinking web of material 26, is drawn together, as a result of which it undergoes crimping, in particular at the edges 35.

Downstream of the cooling station 43, the crimped web of material 26 thus provided with the strands 29 is wound up on an intermediary storage reel 46. The web of material 26 thus prepared can then be further processed in the apparatus shown in FIG. 10 to form the final contact material.

In the illustrative embodiment of FIG. 10, the web of material 26 provided with the strands 29 is further processed, initially in three planes. To this end, the web of material 26 provided with the strands 29 is simultaneously taken off three intermediary storage reels 46 arranged one above the other. In the course of takeoff, initially the strips 20 are cut into every web of material 26 when each web of material 26 moves past a blade unit 47 to form the (straight-line) incisions 30 between adjacent strips 20. The blade units 47 are liftable from time to time, by lifting means not depicted, disengaging them from the web of material 26 to form (uncut) holding webs 20 on each occasion.

Downstream of the blade unit 47 for every web of material 26, the apparatus has appropriate blanking means 48, which blank out the incisions 30 between adjacent strips 20. To ensure continuous fabrication, the blanking stations 48 may be of the "flying" type.

Downstream of the blanking stations 48 all three webs of material 26 provided with incisions 27 and 30 are brought together by guiding the two outer layers 22 by deflecting rollers 49 toward the central, inner layer 23, in between a pair of rolls 50. Viewed in the fabrication direction (arrow 51), the pair of rolls 50 is followed by a welding means 52 which serves to join the layers 22 and 23 together in the area of their holding webs 21 to form the weld seam 33. Accordingly, the welding means 52 is activated periodically, specifically whenever the three superposed holding webs 21 of the layers 22 and 23 are in the area of the welding means 52.

The welding means 52 is followed in the fabrication direction by a last pair of rolls 53 and a deflecting roller from where the contact material of connected units is wound onto a stock reel 55. Individual contact material units are removable in succession to assemble the trickling filter and are placeable onto appropriate supporting bars 31 of the supporting frame 32.

At least one of the pairs of rolls 50 and 53 of the apparatus is rotatably driveable to pull the web of material 26 to be processed through the blade unit, the blanking unit and the welding means.

Alternatively, it is conceivable to arrange the apparatus part shown in FIG. 10 immediately downstream of the first apparatus section of FIG. 9. In this case the winding of the web of material 26 provided with the strands 29 onto the intermediary storage reel 46 is thus omitted. This alternative is suitable in particular for manufacturing contact material from a single-layer web of material 26. But even a multilayered contact material can be manufactured to completion in successive steps, namely, if the individual layers 22 and 23 are produced simultaneously on a plurality of extruders 39.

Finally, FIG. 11 shows an alternative to the apparatus shown in FIG. 10. This alternative is suitable in particular for manufacturing snakelike strips 36 according to FIGS. 6 to 8. The waves of the snakelike strips 36 here are formed by a cutting means 56 equipped with a thermocutting pin, a cutting blade, a cutting roll or the like, which during the continuous forward movement of the web of material 26 in the fabrication direction 51 is moved forward and backward transversely thereto at regular intervals. This orthogonal juxtaposition of direction is useful for the simple formation of parallel wavy edges 38 on the strips 36.

What is claimed is:

1. A plastic contact material for treatment of liquids, in particular for biological water treatment, comprising a plurality of strips made of a plastic material, each of said strips having at least one strand-like tension element of low extensibility extending in the longitudinal direction of said strips and being firmly bonded to said strip.

2. The contact material as claimed in claim 1, wherein said tension element comprises a single strand arranged approximately in the middle on one side of each strip, and each strip is provided with straight parallel edges.

3. The contact material as claimed in claim 1, wherein said tension element comprises a single, approximately straight-line strand arranged on one side of each strip, each strip having equally wavy parallel edges, and said strand being arranged in such a way that the strand extends in a straight line between said wavy edges along the entire length of said strips.

4. The contact material as claimed in claim 1, wherein said tension element comprises a single strand firmly bonded to said strip at approximately in the middle on one side of each strip, each strip being provided with straight parallel edges and including crimps defined therein.

5. The contact material as claimed in claim 1, wherein said tension element comprises a single, approximately straight-line strand firmly bonded to said strip on one side of each strip, each strip having equally wavy parallel edges, said strand being arranged in such a way that the strand extends in a straight line between said wavy edges along the entire length of said strip, and said strip further includes crimps defined therein.

6. The contact material as claimed in claim 1 wherein said tension element comprises a strand having an approximately round cross-section, the diameter of said strand being a multiple of the thickness of the strip and said strand being comprised of a thermoplastic of lower extendibility than said strip.

7. The contact material of claim 6 wherein said thermoplastic is a material selected from the group consisting of polypropylene and polyethylene.

8. The contact material as claimed in claim 1 wherein each of said strips is connected to a holding web.

9. The contact material as claimed in claim 8 further comprising a plurality of spaced-apart strips in a side by side arrangement on opposite side of said holding web, said strips being defined by incisions in at least one area bordering the holding web.

10. The contact material as claimed in claim 8, comprising a plurality of holding webs with strips arranged thereon, said holding webs being disposed on top of one another and bonded together.

* * * * *